Figure 3:
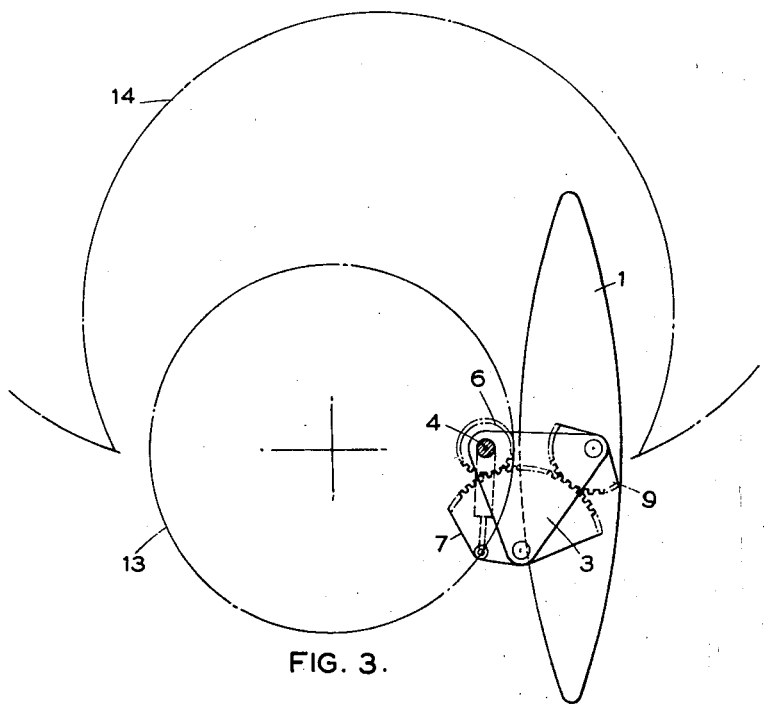

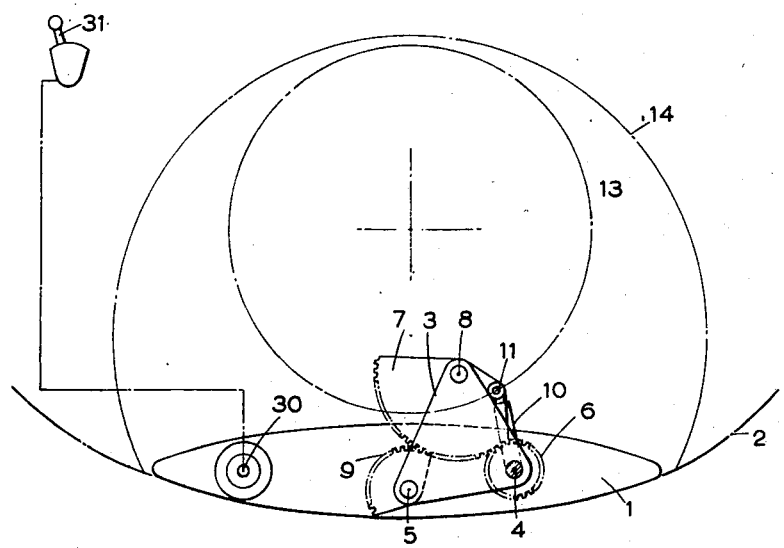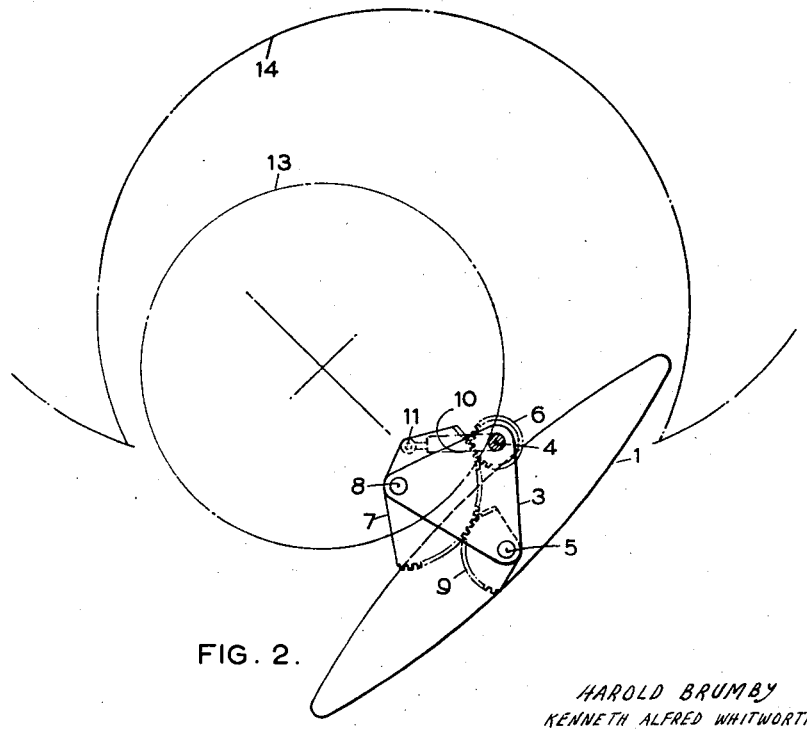

Aug. 2, 1960　　　H. BRUMBY ET AL　　　2,947,533
DOORS OR CLOSURE MEMBERS FOR BOMB BAYS OR LIKE
SPACES IN THE FUSELAGES OR WINGS OF AIRCRAFT
Filed April 15, 1955　　　　　　　　　　　3 Sheets-Sheet 2

HAROLD BRUMBY
KENNETH ALFRED WHITWORTH
INVENTOR.

BY
Richardson, David and Nardon
ATTORNEYS.

Aug. 2, 1960    H. BRUMBY ET AL    2,947,533
DOORS OR CLOSURE MEMBERS FOR BOMB BAYS OR LIKE
SPACES IN THE FUSELAGES OR WINGS OF AIRCRAFT
Filed April 15, 1955    3 Sheets-Sheet 3

HAROLD BRUMBY
KENNETH ALFRED WHITWORTH
INVENTOR.

BY
Richardson, David and Nordon
ATTORNEYS.

United States Patent Office 2,947,533
Patented Aug. 2, 1960

2,947,533

DOORS OR CLOSURE MEMBERS FOR BOMB BAYS OR LIKE SPACES IN THE FUSELAGES OR WINGS OF AIRCRAFT

Harold Brumby, Elloughton, Brough, and Kenneth Alfred Whitworth, Hull, England, assignors to The Blackburn Group Limited, Brough, England, a British company Filed Apr. 15, 1955, Ser. No. 501,680

Claims priority, application Great Britain Dec. 13, 1954

7 Claims. (Cl. 268—30)

This invention relates to improvements in doors which are rotatable from one position in which parts carried thereby are concealed within a container to another position in which such carried parts are exposed, and it is more especially concerned with such a door for aircraft to close a space, more particularly in the fuselage such that a bomb or bombs, rockets, guns and so forth may normally be carried in such space and as required be brought into exposed operative position.

A door which merely rotates about a fixed axis which passes through the door itself has the disadvantage that the rotary door must be relatively wide to permit the bomb load carried thereby to pass from its concealed to its exposed position and there is a further disadvantage that the mass of the bomb load, which will considerably outweigh the mass of the door, is unbalanced about the hinge axis so giving rise to a moment tending to accelerate the movement of the door, particularly during opening movement, which may give rise to trouble at the arresting of the door in its open inverted position with the bomb load exposed.

One object of the present invention is to provide a rotary door which is narrower for a given height or size of load than hitherto possible.

Another object of the present invention is to provide such rotary door which will seal the compartment in the aircraft fuselage or wing in both of its alternative positions, and which is such that when the load carried thereby is in exposed position not only does no part of the door project beyond the ambient surface into the slip stream but the exposed surface of the door maintains the contour of such ambient surface.

To these ends, the door according to the present invention is carried by rotatable mountings operatively associated with means for rotating the door about an axis passing therethrough such that the door travels through a curved path in passing between its normal and reversed positions.

In this way the door is moved from its one position in which its edges seal the space closed thereby by a rotary movement of its mounting with simultaneous rotation about the axis passing therethrough into its alternative position in which its edges again seal the space in the container such as a fuselage or wing of an aircraft.

The door preferably is of like shape on both its surfaces so that in each of its alternative positions, the exposed surface maintains the contour of the ambient surface of the structure, example the aircraft fuselage or wing.

Further according to the present invention the door is carried at its ends by members rotatable about a fixed axis and is provided with operating mechanism such that those members are rotated in timed relation with means for rotating the door in moving it from its one position to the other.

According to one form of the present invention a drivable quadrant meshes with a toothed wheel which effects rotation of a door carrying member and also with a quadrant which effects rotation of the door such that movement of said drivable quadrant effects the simultaneous rotation of the door carrying member and of the door. The drivable quadrant may be rotated by any suitable means conveniently by a hydraulic jack or by an electric actuator, a screw jack or other extensible member.

According to another form of the present invention, a drivable wheel effects rotation of a door carrying member and a toothed wheel drives a toothed quadrant which effects rotation of the door. The drivable wheel is driven by a prime mover, such as an electric motor, the motion of which is taken through an irreversible drive such as a worm driving a worm wheel constituting the drivable wheel the rotation of which is taken to the door carrying member. A toothed wheel on the same shaft meshes through an idler with a quadrant fast with the door such that as the door carrying member is rotated about its axis, the quadrant is also rotated to rotate the door.

The door according to the present invention, as applied to aircraft, may carry a load in the form of a single large bomb, or two or more bombs disposed end-to-end or side-by-side or both end-to-end and side-by-side, rockets in parallel side-by-side relation or parallel side-by-side and superposed arrangement, a large calibre gun or a plurality of guns, or other load which is normally carried internally but in operative position must be exposed externally of the aircraft.

In all cases due to the particular movement of the door during opening and closing movement a larger or higher load can be taken through a given size opening than is possible by a mere rotation of the door and only a minimum of space is required internally to permit such movement of the door.

The door mounting has a further advantage in that it may still be opened in the event of a power failure and locked mechanically in each of its alternative positions.

In order that the invention may be clearly understood and readily carried into effect an embodiment thereof with alternative actuating mechanism is hereinafter more fully described with reference to the accompanying diagrammatic drawings which are given for purposes of illustration only, and not of limitation.

Figure 4:
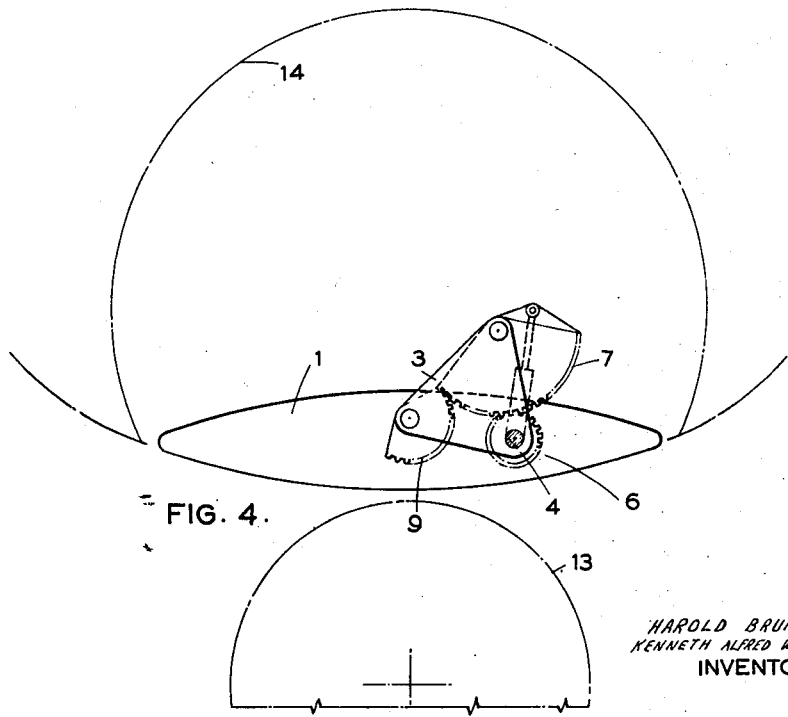
Figure 5:
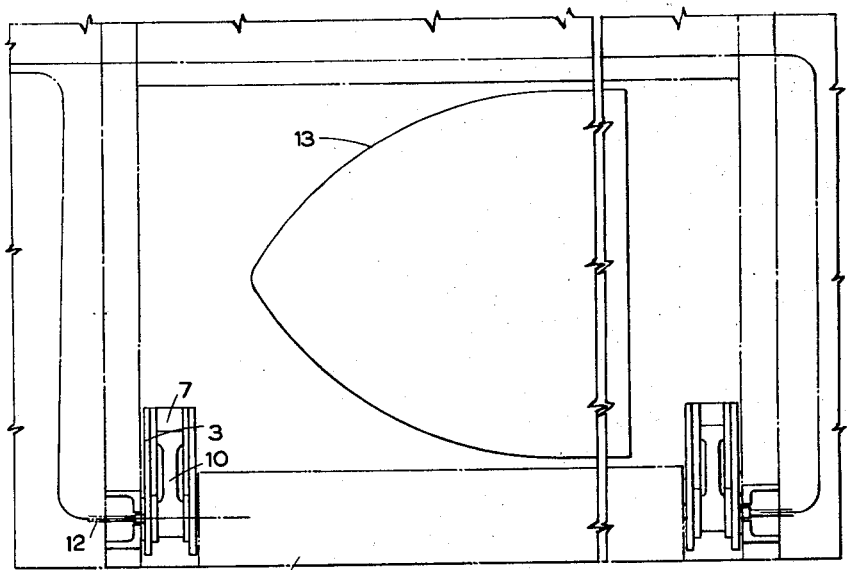

In these drawings:

Figure 1 is an end elevation of the door with one form of actuating mechanism, with the door shown in its normal or closed position, Figure 2 is a view similar to Figure 1 after displacement of the door through one quarter of its opening movement, Figure 3 is again a similar view showing the door half way through its travel, Figure 4 is again a similar view after the door has completed its travel in the inverted position in which it again closes the door opening, and Figure 5 is a side elevation of the door and its mounting.

Figure 6:
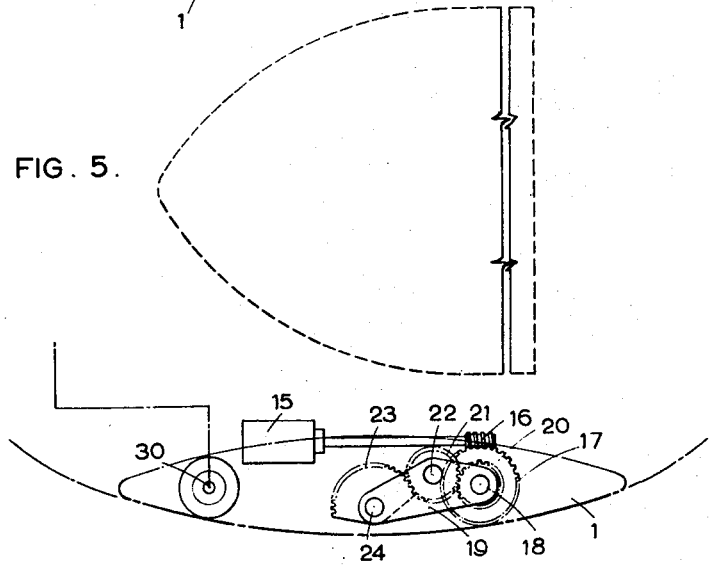
Figure 7:
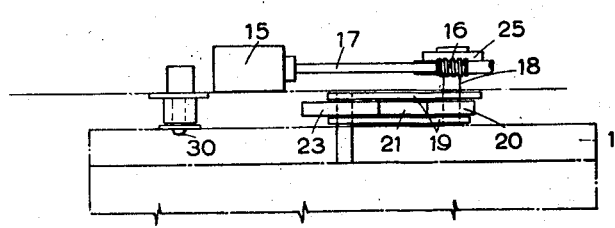

Figure 6 is a view similar to Figure 1 showing a different mechanism for effecting movement of the door between normal and inverted positions, and Figure 7 is a plan view looking down on Figure 6.

Referring now to the said drawings, and in particular to Figures 1 to 5 thereof, a door 1, which normally closes an aperture such as that opening into a bomb bay or like receptacle in the fuselage 2 of an aircraft, is carried at its ends by members 3 rotatable about a shaft 4 being rotatably carried by a shaft 5. A toothed wheel 6 on the shaft 4 but fixed as by connection to the structure, meshes with a quadrant 7 rotatable on a shaft 8 carried by the member 3. The quadrant 7 meshes with a quadrant 9 on the shaft 5 and fast with the door 1. A hydraulic jack or equivalent extensible member 10 extends between the shaft 4 and a point 11 on the quadrant 7 in an arrangement such that expansion of such jack 10 moves the point 11 away from the shaft 4 so rotating the quadrant 7, the movement of which relative to the quadrant 9 and toothed wheel 6, is by the former to rotate the door 1 about the axis of the shaft 5 and by the latter to rotate the member 3 about the axis of the shaft 4. Hydraulic fluid for actuating the jack 10 is conveyed by a conduit through the shaft 4 which is hollow for the purpose, to open into the interior of the jack body. The normal position of the door is shown in Figure 1 in which the jack 10 is fully contracted so that the door is held in such normal closed position in which its exterior surface maintains the contour of the ambient surface of the fuselage and its edges seal the edges of the opening closed by the door. To open the door, hydraulic fluid under pressure is fed through the conduit 12 to the jack 10 to expand the same so that its extensible member by thrusting on the point 11 of the quadrant 7, rotates the same about the shaft 8 with the result that the quadrant 7 rolls around the fixed toothed wheel 6 to bring about a bodily movement of the member 3 about the shaft 4 and by rotating the quadrant 9 bring about rotation of the door 1 about the axis of the shaft 5. The movement of the door and the relative position of the parts at a quarter of its travel is shown in Figure 2, whilst in Figure 3 the door is shown half-way through its travel. The continued expansion of the jack 10 by continuing the movement of the quadrant 7 continues the displacement and rotation of the door through to its alternative position illustrated in Figure 4, in which the door is brought into inverted position again closing the opening with, in the case of the door illustrated, its now exposed internal surface maintaining the contour of the ambient surface of the aircraft fuselage. By virtue of such movement of the door through a curved path with its simultaneous rotation, a much larger and higher load can be carried thereby and taken out through the opening which the door closes than is possible with a door which merely rotates and further, by virtue of such movement only a minimum of space is required within the aircraft fuselage to accommodate the door during its movement between its alternative positions, thus the circle 13 indicates a bomb or other store which may be carried by the door and be capable of being taken out through a door opening of the size illustrated in the drawings as will be appreciated from an examination of Figure 3 whilst the arc 14 indicates the small size of the bomb bay needed to accommodate such bomb or other store and provide space for the movement of the door between its alternative positions. The door is normally latched in each of its alternative positions by a latch 30 which engages a recess in the end wall of the door. Prior to movement of the door this latch is withdrawn mechanically and preferably by means of a control member 31, the initial movement of which withdraws the latch and the further movement of which operates a valve or valves controlling the supply of fluid under pressure through to the jack 10.

Other mechanism may be employed for bringing about rotation of the door simultaneously with the rotation of its supporting members thus as illustrated in Figures 6 and 7 a prime mover such as an electric motor 15 may drive through an irreversible drive, such as the worm 16 driving a worm wheel 17 fast on a shaft 18 on which is also fast the door carrying member 19. A fixed toothed wheel 20 on the shaft 18 meshes through an idler 21 carried on a shaft 22 by the door carrying member 19 with a quadrant 23 fast with the door and rotatable therewith about the shaft 24, by means of which the door is carried by the member 19. This arrangement is such that on operation of the motor 15 the wheel 17 is driven to rotate the door carrying member 19 so that that member is rotated about the axis of the shaft 18 and the idler 21 running around the toothed wheel 20 rotates the quadrant 23 to rotate the door 1 which is moved in the same way as already described with reference to Figures 1 to 4 between its normal position and its inverted position. The drive through to the shaft 18 preferably includes a clutch 25 which may be disengaged in the event of failure of the electric power to permit free or manual movement of the door 1 which is conveniently latched in its alternative positions by the latch 30 which is disengaged mechanically by the operating member 31 which must be moved to withdraw the latch before closing the circuit to the electric motor.

We claim:

1. In combination, an enclosure wall provided with a door opening, a reversible door therefor operable between a first position in which it closes the door opening and a second position identical with the first in which it also closes the door opening but has its inner and outer faces reversed, and operating means for effecting and controlling movement of the door between the first and second positions in such fashion that the door when half within and half without the enclosure is positioned well toward one side of the door opening from the middle thereof for making available a wide exit way, said operating means comprising door carriers supported respectively by the upper and lower portions of an enclosure wall from above and below the door opening for rotation about a fixed axis which extends between the middle of the door opening and one side thereof in the plane of the door opening and is well spaced both from the middle of the door opening and from the adjacent side of the door opening, means pivotally supporting the door on the carriers for rotation relative to the carriers about a movable axis that extends along a central portion of the door, actuating means for rotating the carrier through substantially a full revolution to carry the said movable door axis from the middle of the door opening over close to one side of the door opening and then on around to the middle of the door opening again, and means responsive to said actuating means for causing the door to be turned about its own axis in the direction opposite to that in which it is turned by the carriers at an angular velocity such that the door will be carried and turned by a compound movement from its first to its second position or vice versa by the total operation of said actuating means.

2. In combination, an enclosure wall provided with a door opening, a reversible door therefor operable between a first position in which it closes the door opening and a second position identical with the first in which it also closes the door opening but has its inner and outer faces reversed, and operating means for effecting and controlling movement of the door between the first and second positions in such fashion that the door when half within and half without the enclosure is positioned well toward one side of the door opening from the middle thereof for making available a wide exit way, said operating means comprising combined door and epicyclic gear carriers mounted for rotation through substantially a full revolution about a fixed axis which extends between the middle of the door opening and one side thereof in the plane of the door opening and is well spaced both from the middle of the door opening and from the adjacent side thereof, sun gears concentric with the respective carriers, first epicyclic gear members on the respective carriers in mesh with the associated sun gears, second epicyclic gear members on the carriers secured in fixed relation to the door and in mesh with the associated first epicyclic gear members, and actuators for said gears adapted to drive the carriers through substantially a complete revolution to carry the door axis from substantially the middle of the door opening through a position closely adjacent to one side boundary thereof and then on around substantially to the middle of the door opening again, while the epicyclic gears acting in response to said actuating means cause the door to turn with the carriers but at a rotary speed such that the door is carried and turned by a compound movement substantially from its first position to its second position or vice versa.

3. A structure as set forth in claim 2, in which the actuator consists of a jack interposed between the axis of the sun gear and a portion of the first epicyclic gear.

4. A structure as set forth in claim 2, in which the actuator comprises a reversible drive motor and a one way drive from the motor to the sun gear which includes a worm driven by the motor and a worm gear driven by the worm.

5. A structure as set forth in claim 2, in which the carriers take the form of triangular plates and the axes of the sun gears, the first epicyclic gear members and the second epicyclic gear members are located at the respective vertices of the triangle.

6. In combination, an enclosure wall provided with a door opening, a reversible door therefor operable between a first position in which it closes the door opening and a second position identical with the first in which it also closes the door opening but has its inner and outer faces reversed, and operating means for effecting and controlling movement of the door between the first and second positions in such fashion that the door when disposed about half within and half without the enclosure is positioned within the door opening and closely adjacent to one side of the boundary of the door opening and makes available a wide exit way, said operating means comprising combined door and planet gear carriers mounted for rotation through substantially a full revolution about a fixed axis located in the plane of the door opening between the middle of the door opening and one side thereof and well spaced both from the middle of the door opening and from the adjacent side boundary thereof, fixed sun gears associated with the respective carriers and concentric with them, first epicyclic gear members on the respective carriers in mesh with the associated sun gears, second epicyclic gear members on the carriers secured in fixed relation to the door and in mesh with the associated first epicyclic gear members, and actuators for the first epicyclic gear members, the construction and arrangement being such that the actuators are adapted to drive the carriers though substantially a complete revolution to carry the door axis from substantially the middle of the door opening through a position closely adjacent to one side boundary thereof and then on around substantially to the middle of the door opening again, while the epicyclic gear members in response to the actuating members cause the door to turn with the carriers but at a rotary speed such that the door is carried and turned by a compound movement substantially from its first position to its second position or vice versa.

7. In combination, an enclosure wall provided with a door opening, a reversible door therefor movable between a first position in which it closes the door opening and a second position identical with the first in which it also closes the door opening but has its inner and outer faces reversed, and operating means for effecting and controlling movement of the door between the first and second positions in such fashion that the door when about half within and half without the enclosure is positioned within the door opening closely adjacent to one side of the boundary door opening and extends at right angles to the door opening for making available a wide exit way, said operating means comprising combined door and epicyclic gear carriers mounted for rotation through substantially a full revolution about a fixed axis located in the plane of the door opening between the middle of the door opening and one side thereof and spaced well away from the middle of the door opening and from the adjacent side boundary thereof, rotatable sun gears concentric with the respective carriers, first epicyclic gear members on the respective carriers in mesh with the associated sun gears, second epicyclic gear members on the carriers secured in fixed relation to the door and in mesh with the associated first epicyclic gear members, and actuators connected to drive the sun gears for effecting movement of the door from its first position to its second position or vice versa, the arrangement being such that the door axis is carried from substantially the middle of the door opening through a position closely adjacent to one side boundary thereof and then on around substantially to the middle of the door opening again, while the epicyclic gears and the carriers cause the door to turn with the carriers but at a rotary speed such that the door is carried and turned by a compound movement through a half revolution in response to a full revolution of the carriers.

References Cited in the file of this patent

UNITED STATES PATENTS

| | | |
|---|---|---|
| Re. 12,260 | Boos | Aug. 23, 1904 |
| 726,957 | Macey | May 5, 1903 |
| 938,719 | Smith | Nov. 2, 1909 |
| 2,230,783 | Parsons et al. | Feb. 4, 1941 |
| 2,491,261 | Greer et al. | Dec. 13, 1949 |
| 2,604,281 | Buchal et al. | July 22, 1952 |
| 2,634,656 | Woolens et al. | Apr. 14, 1953 |
| 2,642,392 | Sommers | June 16, 1953 |